United States Patent
Xiong et al.

(10) Patent No.: US 10,959,269 B2
(45) Date of Patent: *Mar. 23, 2021

(54) METHOD AND EQUIPMENT FOR DETERMINING ASSOCIATION PERIOD FOR SYNCHRONIZATION SIGNAL BLOCKS

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/369,894

(22) Filed: Mar. 29, 2019

(65) Prior Publication Data

US 2019/0306892 A1 Oct. 3, 2019

(30) Foreign Application Priority Data

Apr. 2, 2018 (CN) .......................... 2018 1 0284652

(51) Int. Cl.
*H04W 74/08* (2009.01)
*H04W 56/00* (2009.01)
(Continued)

(52) U.S. Cl.
CPC ..... *H04W 74/0833* (2013.01); *H04W 56/001* (2013.01); *H04W 72/0446* (2013.01);
(Continued)

(58) Field of Classification Search
CPC ........... H04W 74/0833; H04W 88/023; H04W 56/001; H04W 88/08; H04W 72/0446;
(Continued)

(56) References Cited

U.S. PATENT DOCUMENTS

2016/0302234 A1 10/2016 Martinez et al.
2018/0049248 A1 2/2018 Baldemair et al.
(Continued)

FOREIGN PATENT DOCUMENTS

WO 2017-017583 A1 2/2017
WO 2018-031116 A1 2/2018

OTHER PUBLICATIONS

Nokia et al., 'Summary of Remaining Details on RACH Procedure', R1-1801097, 3GPP TSG-RAN; Jan. 24, 2018, Vancouver, BC, Canada.

(Continued)

*Primary Examiner* — Dady Chery
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for internet of things (IoT) are provided. The disclosure may be applied to intelligent services based on the 5G communication technology and the IoT-related technology, such as smart home, smart building, smart city, smart car, connected car, health care, digital education, smart retail, security and safety services. The communication method may include receiving, from a base station, a message including first information on a physical random access channel (PRACH) configuration period, identifying a set of association period which corresponds to the PRACH configuration period, identifying an association period from the set of association period, and transmitting, to the base station, a random access preamble in a random access occasion within the association period.

20 Claims, 7 Drawing Sheets

(51) Int. Cl.
*H04W 88/08* (2009.01)
*H04W 72/04* (2009.01)
*H04W 88/02* (2009.01)

(52) U.S. Cl.
CPC ....... *H04W 72/0453* (2013.01); *H04W 88/02* (2013.01); *H04W 88/023* (2013.01); *H04W 88/08* (2013.01)

(58) Field of Classification Search
CPC ............. H04W 88/02; H04W 72/0453; H04W 74/006; H04L 41/0803
See application file for complete search history.

(56) References Cited

U.S. PATENT DOCUMENTS

| | | | |
|---|---|---|---|
| 2019/0208550 A1* | 7/2019 | Ko | ..................... H04W 72/0446 |
| 2019/0254071 A1 | 8/2019 | Park | |
| 2020/0059878 A1 | 2/2020 | Huang et al. | |
| 2020/0229244 A1 | 7/2020 | Yan et al. | |

OTHER PUBLICATIONS

International Search Report dated Jul. 4, 2019, issued in an International application No. PCT/KR2019/003483.
U.S. Non-Final Office Action dated Jun. 1, 2020, issued in U.S. Appl. No. 16/369,764.
Qualcomm Incorporated: "Summary of Remaining Details on Rach Procedure", 3GPP Draft; R1-1803358, 3rd Generation Partnership Project (3GPP), Mobile Competence Centre ; 650, Route Des Lucioles ; F-06921 Sophia-Antipolis Cedex ; France, vol. Ran WG1, No. Athens, Greece; XP051398528.
Extended European Search Report dated Jan. 22, 2021, issued in European Application No. 19781753.9.
Office Action dated Jan. 22, 2021, issued in U.S. Appl. No. 16/369,764.

* cited by examiner

METHOD AND EQUIPMENT FOR DETERMINING ASSOCIATION PERIOD FOR SYNCHRONIZATION SIGNAL BLOCKS

CROSS-REFERENCE TO RELATED APPLICATION(S)

This application is based on and claims priority under 35 U.S.C. § 119 of a Chinese patent application number 201810284652.0, filed on Apr. 2, 2018, in the China National Intellectual Property Administration (CNIPA), the disclosure of which is incorporated by reference herein in its entirety.

BACKGROUND

1. Field

The disclosure relates to the technical field of radio communication. More particularly, the disclosure relates to a method and equipment for determining an association period for synchronization signal blocks (SSBs).

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

In a new radio (NR) communication system, before the establishment of radio resource control, for example, during a random access process, the performance of random access directly influences the user's experience. For a conventional radio communication system, for example, LTE or LTE-advanced, the random access process is used in various scenarios such as establishment of an initial link, cell handover, reestablishment of an uplink and reestablishment of an RRC connection.

In the known radio communication systems, during the downlink communication, the system periodically transmits synchronization signals and broadcast channels to a user though synchronization signal/physical broadcast channel (PBCH) blocks (SSBs). The periodicity is called SSB periodicity or SSB burst periodicity. Meanwhile, a base station will configure a physical random access channel (PRACH) configuration period within which a certain number of PRACH transmission occasions (ROs) are configured, and all SSBs can be associated to corresponding ROs within an association period (within a certain duration). In this case, the association period value for SSBs is relatively fixed and cannot be adjusted dynamically, so that the requirements of the NR communication system cannot be satisfied due to the low efficiency of random access between the base station and the user equipment.

In view of this, it is necessary to provide a method and equipment for determining an association period for synchronization signal blocks in order to solve the above technical problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and equipment for determining an association period for synchronization signal blocks (SSBs), by which the association period for SSBs can be adjusted dynamically.

Additional aspects will be set forth in part in the description which follows and, in part, will be apparent from the description, or may be learned by practice of the presented embodiments.

In accordance with an aspect of the disclosure, a method by a terminal in a wireless communication system is provided. The method includes receiving, from a base station, a message including first information on a physical random access channel (PRACH) configuration period, identifying a set of association period which corresponds to the PRACH configuration period, identifying an association period from the set of association period, and transmitting, to the base station, a random access preamble in a random access occasion within the association period.

According to another embodiment of the disclosure, the message further includes second information on a number of synchronization signal blocks (SSBs) within an SSB periodicity, and the association period is identified from the set of association period based on the second information.

According to another embodiment of the disclosure, the association period is identified to map all SSBs within the SSB periodicity at least once to corresponding random access occasions within the association period.

According to another embodiment of the disclosure, the association period is a smallest value from the set of association period such that all of the SSBs within the SSB periodicity are mapped to the corresponding random access occasions within the association period.

According to another embodiment of the disclosure, at least one random access occasions within the association period which is not mapped to any of the SSBs within the SSB periodicity is not used for a transmission of the random access preamble.

In accordance with another aspect of the disclosure, a method by a base station in a wireless communication system is provided. The method includes transmitting, to a terminal, a message including first information on a physical random access channel (PRACH) configuration period, and receiving, from the terminal, a random access preamble in a random access occasion within an association period, the association period being identified from a set of association period which corresponds to the PRACH configuration period.

In accordance with another aspect of the disclosure, a terminal in a wireless communication system is provided. The terminal includes a transceiver for transmitting and receiving a signal, and at least one processor configured to control the receiver to receive, from a base station, a message including first information on a physical random access channel (PRACH) configuration period, identify a set of association period which corresponds to the PRACH configuration period, identify an association period from the set of association period, and transmit, to the base station, a random access preamble in a random access occasion within the association period.

In accordance with another aspect of the disclosure, a base station in a wireless communication system is provided. The base station includes a transceiver for transmitting and receiving a signal, and at least one processor configured to control the transceiver to transmit, to a terminal, a message including first information on a physical random access channel (PRACH) configuration period, and receive, from the terminal, a random access preamble in a random access occasion within an association period, the association period being identified from a set of association period which corresponds to the PRACH configuration period.

Compared with the prior art, the disclosure has the following technical (and advantageous) effects, but not limited thereto. By determining an association period for SSBs by a valid association period set for SSBs, the number or duration of the actually used periods (i.e., the association period for SSBs) can be flexibly adjusted, and the efficiency of random access between a base station and a user equipment is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
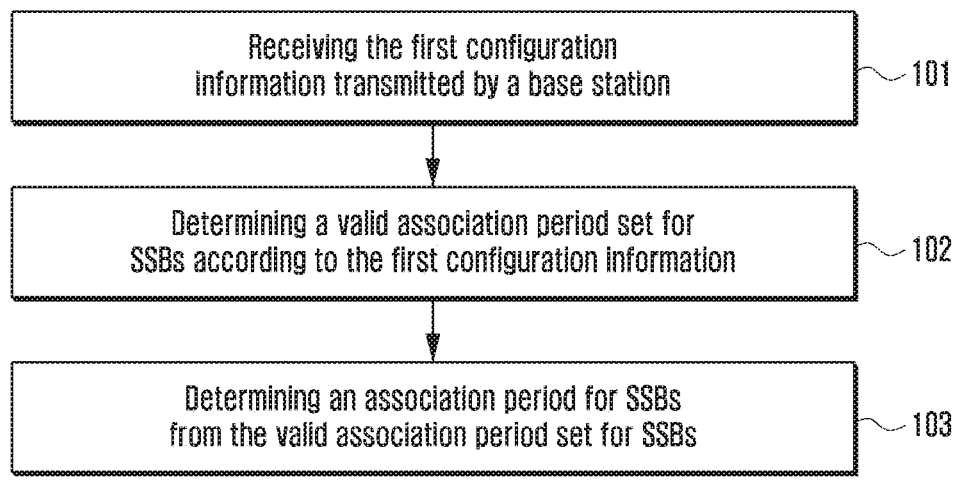
FIG. 1 is a flowchart of a method for determining an association period for synchronization signal blocks (SSBs) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as being merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by one person of ordinary skill in the art that singular forms "a", "an", "the", and "said" may be intended to include plural forms as well, unless otherwise stated. It should be further understood that terms "comprise/comprising" used in this specification of the disclosure specify the presence of the stated features, integers, operations, elements and/or components, but not exclusive of the presence or addition of one or more other features, integers, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "user equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; personal communication systems (PCSs) with combined functionalities of speech, data processing, facsimile and/or data communication; personal digital assistants (PDAs), which may include radio frequency (RF) receivers, pagers, internet networks/intranet accesses, web browsers, notepads, calendars and/or global positioning system (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a mobile internet device (MID) and/or a mobile phone with a music/video playback function, or can be equipment such as a smart television (TV) and a set-top box.

Figure 2:
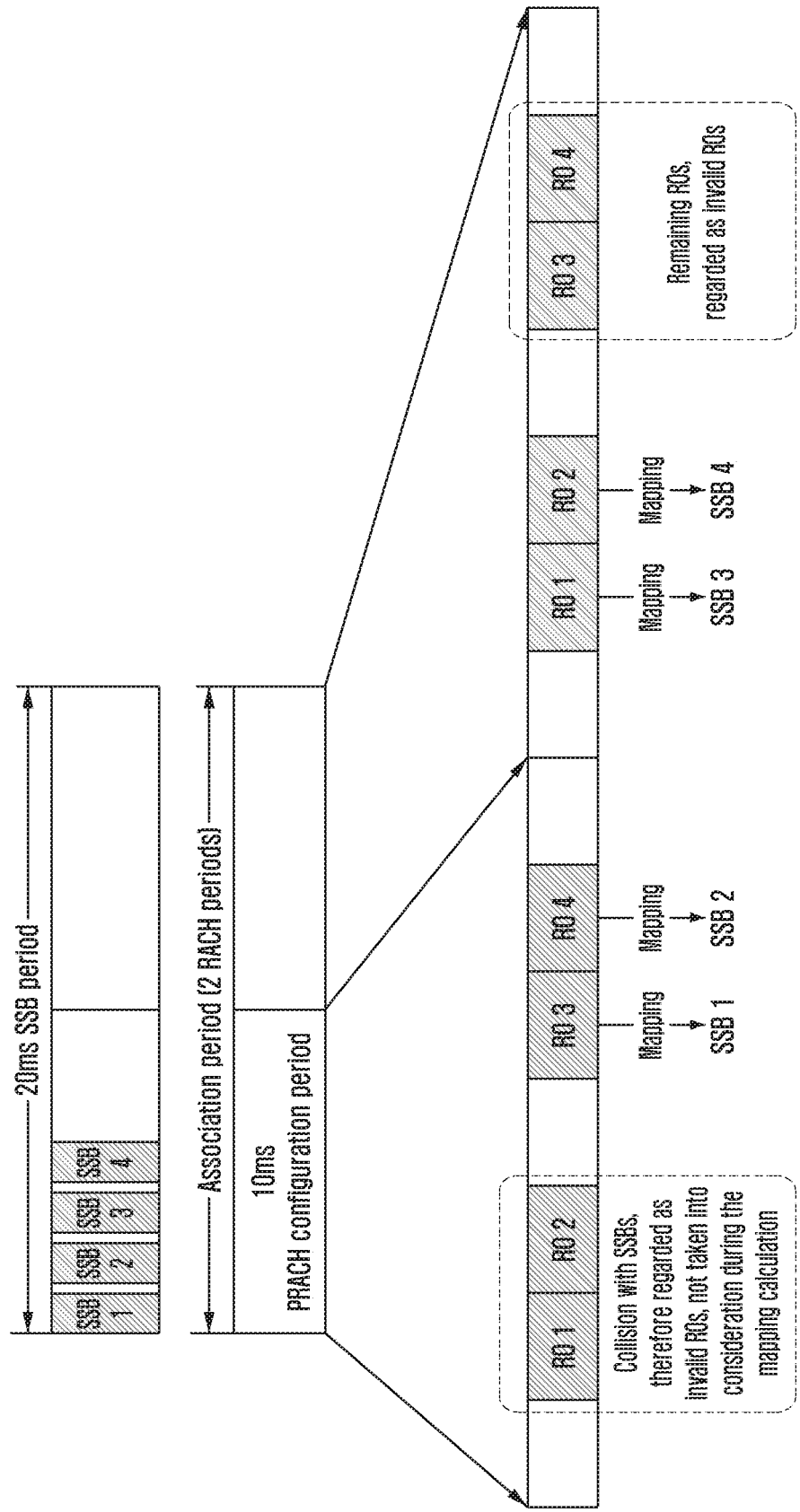
FIG. 2 is a schematic diagram of a first association between SSBs and PRACH transmission occasions according to an embodiment of the disclosure.
Figure 3:
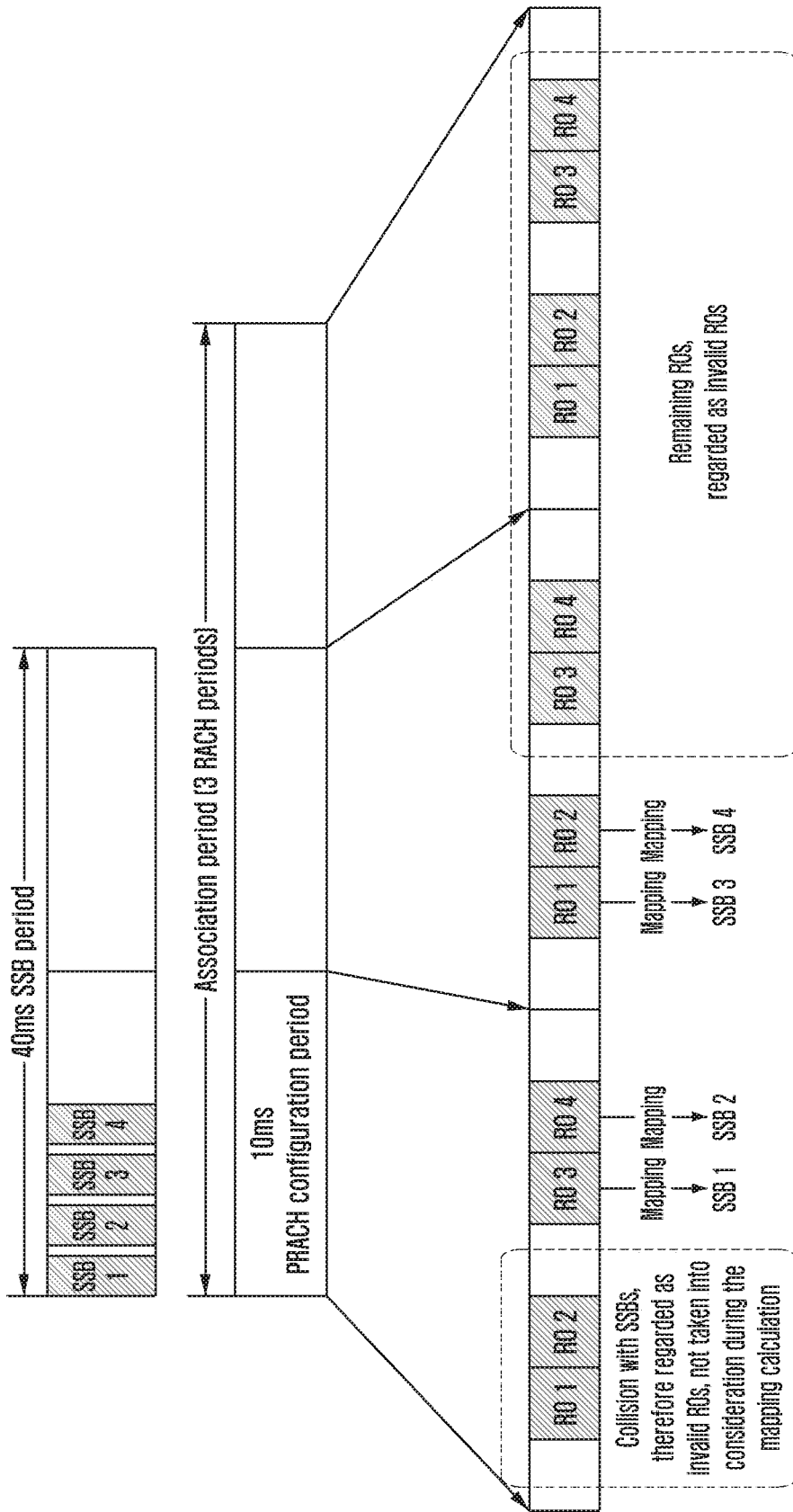
FIG. 3 is a schematic diagram of a second association between SSBs and PRACH transmission occasions according to an embodiment of the disclosure.
Figure 4:
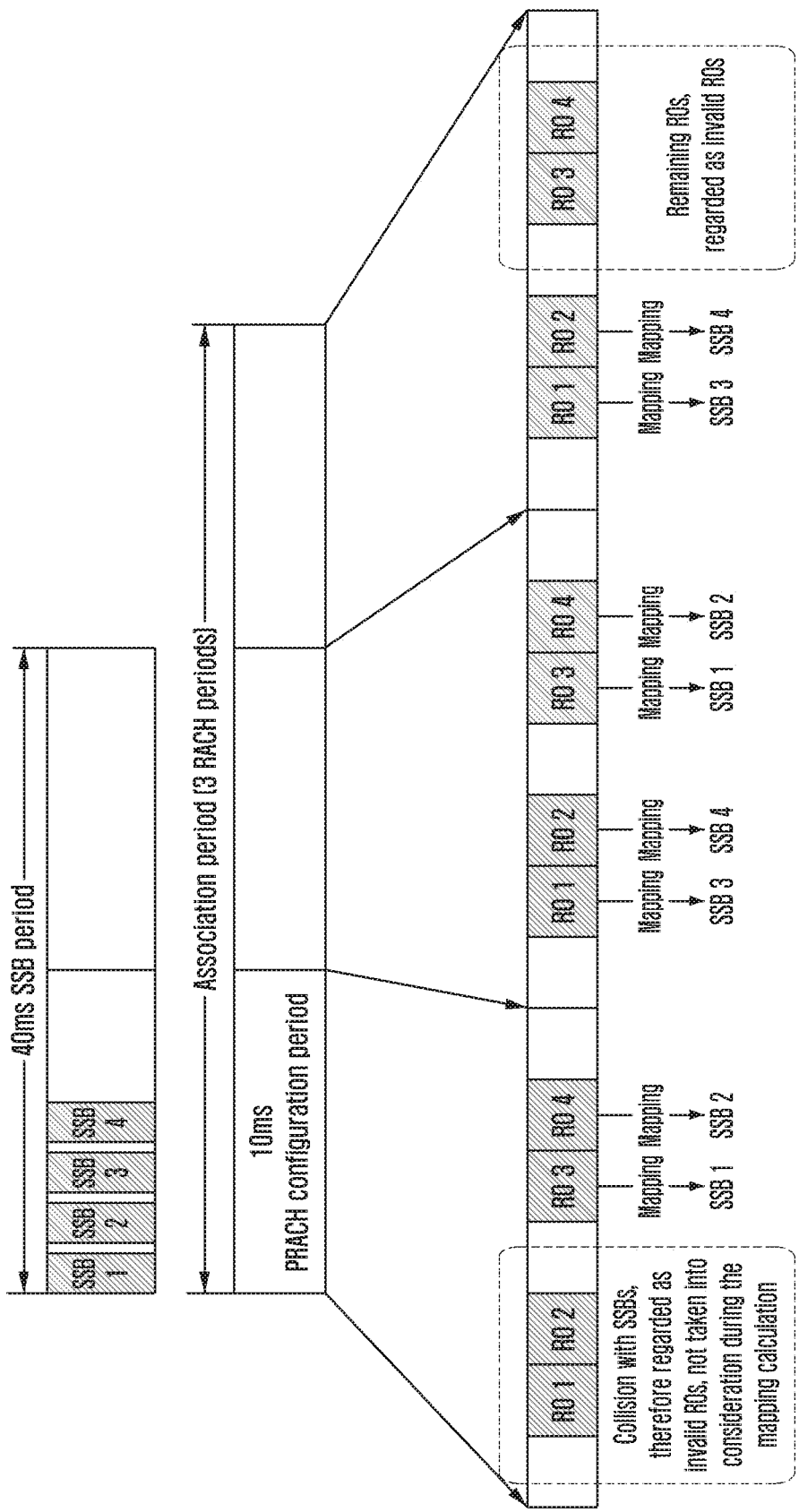
FIG. 4 is a schematic diagram of a third association between SSBs and PRACH transmission occasions according to an embodiment of the disclosure.

FIG. 1 is a flowchart of a method for determining an association period for synchronization signal blocks (SSBs) according to an embodiment of the disclosure. FIG. 2 is a schematic diagram of a first association between SSBs and PRACH transmission occasions according to an embodiment of the disclosure. FIG. 3 is a schematic diagram of a second association between SSBs and PRACH transmission occasions according to an embodiment of the disclosure. FIG. 4 is a schematic diagram of a third association between SSBs and PRACH transmission occasions according to an embodiment of the disclosure.

Referring to FIGS. 1-4, the method for determining an association period for SSBs provided by the disclosure comprises the following operations of: operation 101: receiving first configuration information transmitted by a base station; operation 102: determining a valid association period set for SSBs according to the first configuration information; and operation 103: determining an association period for SSBs from the valid association period set for SSBs.

The method for determining an association period for SSBs provided by the disclosure will be described below.

A user equipment (UE) receives physical random access channel (PRACH) configuration information and/or synchronization signal configuration information from the network side.

The synchronization signal configuration information at least comprises SSB periods, and the number and/or position of SSBs within one SSB period. For example, N successive orthogonal frequency-division multiplexing (OFDM) symbols from the $M^{th}$ OFDM symbol within one slot are regarded as one SSB. That is, the UE can determine the number (N_SSBperPeriod) of all SSBs within one SSB period and corresponding positions.

The PRACH configuration information at least comprises PRACH configuration periods or RACH periods, PRACH configuration index, PRACH frequency domain configuration (PRACH_FDM), the number (numOfSSBperRO) of SSBs associated to each PRACH occasion (RO) and the like, wherein the PRACH configuration index indicates a set of configurations used for notifying a user of the number and/or position of ROs in the time domain within one PRACH configuration period, and the PRACH_FDM represents the number of and/or the position of ROs, which are in the time domain within one PRACH configuration period, in the frequency domain. That is, the UE can determine the number N_ROperRACHperoid and/or position of all ROs within one PRACH configuration period.

In addition, the UE may need to obtain the number N_validROperRACHperoid and position of really valid ROs according to a certain rule. The rule can contain at least one of the following ways:

ROs in collision with a downlink part in an uplink/downlink configuration of a network configuration are regarded as invalid ROs;

ROs in collision with a part, containing SSBs, in a flexible part in the uplink/downlink configuration of the network configuration are regarded as invalid ROs; and ROs in collision with a part, before any SSB or the last SSB, in the flexible part in the uplink/downlink configuration of the network configuration are regarded as invalid ROs.

The UE can determine valid ROs by the following operations.

1. The UE determines valid ROs according to the PRACH configuration information and the uplink/downlink configuration information. For example, the UE notifies the number and position of configured ROs by the PRACH configuration information; and, by the uplink/downlink configuration information, the UE notifies that there are no X parts but only downlink parts or uplink parts in the system, then all ROs in the downlink parts are invalid while all ROs in the uplink parts are valid.

2. The UE determines valid ROs according to the PRACH configuration information and SSB configuration information. For example, the UE notifies the number and position of ROs by the PRACH configuration information; and, the UE acquires the number and position of SSBs by the SSB configuration information, then all ROs in collision with the SSBs or before the SSBs are invalid.

3. The UE determines valid ROs according to the PRACH configuration information and the SSB configuration information as well as the uplink/downlink configuration information. For example, the UE notifies the number and position of ROs by the PRACH configuration information; and, by the uplink/downlink configuration information, the UE notifies that there are downlink parts, X parts and uplink parts in the system, then all ROs in the downlink parts are invalid, ROs before SSBs or in collision with SSBs in the X parts are invalid and all ROs in the uplink parts are valid.

Particularly, when the UE does not find any invalid RO according to the rule, N_validROperRACHperoid=N_ROperRACHperoid.

Thus, the UE needs to determine a valid SSB-to-RO association period (also referred to as an association period hereinafter) according to a certain rule in the following ways:

1. determining of a valid association period and/or an association period set according to the configured PRACH configuration period;

2. determining of a valid association period and/or an association period set according to the configured SSB period, wherein the configured SSB period can be configured by a base station equipment and then transmitted to the UE, and/or can be an SSB period determined by the UE autonomously (for example, a fixed SSB period assumed by the UE);

3. determining of a valid association period and/or an association period set according to the maximum one of the configured PRACH configuration period and the configured SSB period; and 4. determining of a valid association period and/or an association period set by using either the configured PRACH configuration period or the configured SSB period according to different frequency bands.

By taking the determination of a valid association period and/or an association period set according to the configured PRACH configuration period as example, the UE can determine the number of SSBs that can be associated within one given RACH period according to the N_validROperRACHperoid and the numOfSSBperRO, and can then infer that N_mapping complete RACH periods are required to map all SSBs within one SSB period to corresponding ROs according to the N_SSBperPeriod.

1. If the UE has determined an association period set, the UE determines that the actual association period is the minimum association period value greater than or equal to N_mapping in the determined valid association period set. For example, for the PRACH configuration period of 10 ms, the association period set determined by the UE is {1,2,4, 8,16} PRACH configuration periods; and, if the N_mapping calculated by the UE according to the PRACH configuration information and/or the synchronization signal configuration information is equal to 3, the minimum value greater than or equal to 3 in the association period set is selected, that is, the eventually determined association period is 4 PRACH configuration periods. And, the UE performs the following operations:

(1) within the eventually determined association period, the remaining ROs except for ROs to which all SSBs within one or more SSB periods in the calculated association period can be associated completely are regarded as invalid ROs; as shown in FIG. 3, if there are 4 SSBs within one SSB period, there are 4 ROs within one RACH period and one RO is associated to one SSB, the calculated association period is N_mapping=2 RACH periods, and the value in the determined association period set is 2, that is, the eventually determined association period is 2 RACH periods; in this case, the remaining ROs (except for ROs to which the SSBs are associated completely) within the 2 RACH periods are invalid ROs; or (2) within the eventually determined association period, the remaining ROs except for ROs to which all SSBs within one or more SSB periods can be associated completely are regarded as invalid ROs.

2. If the UE has determined a fixed association period value, the UE uses the determined fixed association period value as an actual association period, and the UE performs the following operations:

(1) within the eventually determined association period, the remaining ROs except for ROs to which all SSBs within one or more SSB periods in the calculated association period can be associated completely are regarded as invalid ROs; or (2) within the eventually determined association period, the remaining ROs except for ROs to which all SSBs within one or more SSB periods can be associated completely are regarded as invalid ROs.

Several embodiments of the determination of a valid association period according to different rules by the UE will be described below.

Embodiment 1 (PRACH Configuration Period)

In this embodiment, the disclosure will be described by taking the determination of a valid association period and/or an association period set according to the configured PRACH configuration period as example.

The UE receives PRACH configuration information and/or synchronization signal configuration information from the network side (e.g., from a broadcast channel, a downlink control channel or a higher-layer signaling).

The synchronization signal configuration information at least comprises SSB periods, and the number and/or position of SSBs within one SSB period. For example, N successive OFDM symbols from the $M^{th}$ OFDM symbol within one slot are regarded as one SSB. That is, the UE can determine the number (N_SSBperPeriod) of all SSBs within one SSB period and the corresponding position.

The PRACH configuration information at least comprises PRACH configuration periods or RACH periods, PRACH configuration index, PRACH frequency domain configuration (PRACH_FDM), the number (numOfSSBperRO) of SSBs associated to each PRACH occasion (RO) and the like, wherein the PRACH configuration index indicates a set of configurations used for notifying a user of the number and/or position of ROs in a time domain within one PRACH configuration period, and the PRACH_FDM represents the number of and/or the position of ROs, which are in the time domain within one PRACH configuration period, in the frequency domain. That is, the UE can determine the number N_ROperRACHperoid and/or position of all ROs within one PRACH configuration period. In addition, the UE may need to obtain the number N_validROperRACHperoid and position of really valid ROs according to a certain rule. The rule can contain at least one of the following ways:

ROs in collision with a downlink part in an uplink/downlink configuration of a network configuration are regarded as invalid ROs;

ROs in collision with a part, containing SSBs, in a flexible part in the uplink/downlink configuration of the network configuration are regarded as invalid ROs; and ROs in collision with a part, before any SSB or the last SSB, in the flexible part in the uplink/downlink configuration of the network configuration are regarded as invalid ROs.

Particularly, when the UE does not find any invalid RO according to the rule, N_validROperRACHperoid=N_ROperRACHperoid.

In this case, the UE needs to determine a valid SSB-to-RO association period (also referred to as an association period hereinafter) according to a certain rule. In this embodiment, the method is to determine a valid association period and/or an association period set according to the configured PRACH configuration period. Specifically:

1. Corresponding association period values and/or sets are determined for different PRACH configuration periods according to a certain rule, expressed by a non-negative integer power of 2 as shown in the following table:

Table 1 Examples of PRACH configuration periods and corresponding SSB-RO association period values and/or sets.

TABLE 1

| PRACH configuration period (ms) | Association period set (the number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

In addition to the direct mapping relationship table, the PRACH configuration periods and the corresponding association period values and/or sets can also be described by other equivalent expression methods, for example, by a formula, for example:

the association period value and/or set corresponding to each RACH period is expressed by:

$$\text{Association period set} = \left\{2^0, 2^1, \ldots \frac{RACH-period-max}{RACH-period}\right\},$$

wherein:
RACH-period={10,20,40,80,160};
RACH-period-max=max{RACH-period}=160.

Particularly, in this method, it is also possible to determine corresponding association period values and/or sets for some different PRACH configuration periods, as shown in the following table:

Table 2 Examples of PRACH configuration periods and corresponding association period values and/or sets.

TABLE 2

| PRACH configuration period (ms) | Association period set (the number of RACH periods) |
|---|---|
| 10 | {1, 2, 4} |
| 20 | {1, 2, 4} |
| 40 | {1, 2, 4} |
| 80 | {1, 2} |
| 160 | {1} |

In addition to the direct mapping relationship table, the PRACH configuration periods and the corresponding association period values and/or sets can also be described by other equivalent expression methods, for example, by a formula, for example:

the association period value and/or set corresponding to each RACH period is expressed by:

$$\text{Association period set} = \left\{2^0, 2^1, \ldots \frac{RACH-period-max}{RACH-period-Ref}\right\},$$

wherein:
for RACH-period={10,20,40}, RACH-period-ref=40;
for RACH-period={80}, RACH-period-ref=80;
for RACH-period={160}, RACH-period-ref=160;
RACH-period-max=max{RACH-period}=160.

2. Each PRACH configuration period corresponds to a fixed association period set. For example, for a PRACH configuration period {10,20,40,80,160} ms, the corresponding association period set is {1,2,3} PRACH configuration periods.

In this case, the UE can determine, according to the N_validROperRACHperoid and the numOfSSBperRO, the number of SSBs that can be associated within one given RACH period, and can then infer according to the N_SSBperPeriod that N_mapping complete RACH periods are required to map all SSBs within one SSB period to corresponding ROs.

1. If the UE has determined an association period set, the UE determines that the actual association period is the minimum association period value greater than or equal to N_mapping in the determined valid association period set. For example, for the PRACH configuration period of 10 ms, the association period set determined by the UE is {1,3} PRACH configuration periods; and, if the N_mapping calculated by the UE according to the PRACH configuration information and/or the synchronization signal configuration information is equal to 3, the minimum value greater than or equal to 3 in the association period set is selected, that is, the eventually determined association period is 3 PRACH configuration periods. And, the UE performs the following operations:

(1) within the eventually determined association period, the remaining ROs except for ROs to which all SSBs within one or more SSB periods in the calculated association period can be associated completely are regarded as invalid ROs; as shown in FIG. 4, if there are 4 SSBs within one SSB period, there are 4 ROs within one RACH period and one RO is associated to one SSB, the calculated association period is N_mapping=2 RACH periods, and the value in the determined association period set is 3, that is, the eventually determined association period is 3 RACH periods; in this case, the remaining ROs (except for ROs to which the SSBs are associated completely within 2 RACH periods) within the 3 RACH periods are invalid ROs; or (2) within the eventually determined association period, the remaining ROs except for ROs to which all SSBs within one or more SSB periods can be associated completely are regarded as invalid ROs; as shown in FIG. 4, as described in the above example, in this method, the UE will regard two ROs following the third PRACH configuration period within the association period as invalid ROs.

2. If the UE has determined a fixed association period value, the UE uses the determined fixed association period value as an actual association period, and the UE performs the following operations:

(1) within the eventually determined association period, the remaining ROs except for ROs to which all SSBs within one or more SSB periods in the calculated association period can be associated completely are regarded as invalid ROs; or (2) within the eventually determined association period, the remaining ROs except for ROs to which all SSBs within one or more SSB periods can be associated completely are regarded as invalid ROs.

Embodiment 2 (SSB Period)

In this embodiment, the disclosure will be described by taking the determination of a valid association period and/or an association period set according to the configured SSB period as example. The configured SSB period can be configured by a base station equipment and then transmitted to the UE, and/or can be an SSB period determined by the UE autonomously (for example, a fixed SSB period assumed by the UE).

The UE receives PRACH configuration information and/or synchronization signal configuration information from the network side (e.g., from a broadcast channel, a downlink control channel or a higher-layer signaling).

The synchronization signal configuration information at least comprises SSB periods, and the number and/or position of SSBs within one SSB period. For example, N successive OFDM symbols from the $M^{th}$ OFDM symbol within one slot are regarded as one SSB. That is, the UE can determine the number (N_SSBperPeriod) of all SSBs within one SSB period and the corresponding position.

The PRACH configuration information at least comprises PRACH configuration periods or RACH periods, PRACH configuration index, PRACH frequency domain configuration (PRACH_FDM), the number (numOfSSBperRO) of SSBs associated to each PRACH occasion (RO) and the like, wherein the PRACH configuration index indicates a set of configurations used for notifying a user of the number and/or position of ROs in a time domain within one PRACH configuration period, and the PRACH_FDM represents the number of and/or the position of ROs, which are in the time domain within one PRACH configuration period. That is, the UE can determine the number N_ROperRACHperoid and/or position of all ROs within one PRACH configuration period. In addition, the UE may need to obtain the number N_validROperRACHperoid and position of really valid ROs according to a certain rule. The rule can contain at least one of the following ways:

ROs in collision with a downlink part in an uplink/downlink configuration of a network configuration are regarded as invalid ROs;

ROs in collision with a part, containing SSBs, in a flexible part in the uplink/downlink configuration of the network configuration are regarded as invalid ROs; and ROs in collision with a part before any SSB or the last SSB in the flexible part in the uplink/downlink configuration of the network configuration are regarded as invalid ROs.

Particularly, when the UE does not find any invalid RO according to the rule, then N_validROperRACHperoid=N_ROperRACHperoid.

In this case, the UE needs to determine a valid SSB-to-RO association period (also referred to as an association period hereinafter) according to a certain rule. In this embodiment, the method is to determine a valid association period and/or an association period set according to the configured SSB period. Specifically:

1. Corresponding association period values and/or sets are determined for different SSB periods according to a certain rule, expressed by a non-negative integer power of 2 as shown in the following table:

Table 3 Examples of SSB periods and corresponding association period values and/or sets.

TABLE 3

| SSB period (ms) | Association period set (the number of SSB periods) |
|---|---|
| 5 | {1, 2, 4, 8, 16, 32} |
| 10 | {1, 2, 4, 8, 16} |
| 20 | {1, 2, 4, 8} |
| 40 | {1, 2, 4} |
| 80 | {1, 2} |
| 160 | {1} |

In addition to the direct mapping relationship table, the SSB periods and the corresponding association period values and/or sets can also be described by other equivalent expression methods, for example, by a formula, for example:

the association period value and/or set corresponding to each SSB period is expressed by:

$$\text{Association period set} = \left\{2^0, 2^1, \ldots \frac{SSB-period-max}{SSB-period}\right\},$$

wherein:
SSB-period={5,10,20,40,80,160};
SSB-period-max=max{SSB-period}=160.

Particularly, in this method, it is also possible to determine corresponding association period values and/or sets for some different SSB periods, as shown in the following table:

Table 4 Examples of SSB periods and corresponding association period values and/or sets.

TABLE 4

| SSB period (ms) | Association period set (the number of SSB periods) |
|---|---|
| 5 | {1, 2, 4} |
| 10 | {1, 2, 4} |
| 20 | {1, 2, 4} |
| 40 | {1, 2, 4} |
| 80 | {1, 2} |
| 160 | {1} |

In addition to the direct mapping relationship table, the SSB periods and the corresponding association period values and/or sets can also be described by other equivalent expression methods, for example, by a formula, for example:

the association period value and/or set corresponding to each SSB period is expressed by:

$$\text{Association period set} = \left\{2^0, 2^1, \ldots \frac{SSB-period-max}{SSB-period-Ref}\right\},$$

wherein:
for SSB-period={5,10,20,40}, SSB-period-ref=40;
for SSB-period={80}, SSB-period-ref=80;
for SSB-period={160}, SSB-period-ref=160
SSB-period-max=max{SSB-period}=160.

2. Each SSB period corresponds to a fixed association period set. For example, for an SSB period {5,10,20,40,80,160} ms, the corresponding association period set is {1,2,3} SSB periods. Particularly, for an SSB period {5,10,20,40,80,160} ms, the corresponding association period is 1 SSB period, that is, the association period is the same as the SSB period.

In this case, the UE can determine, according to the N_validROperRACHperoid and the numOfSSBperRO, the number of SSBs that can be associated within one given RACH period, and can then infer according to the N_SSBperPeriod that N_mapping complete SSB periods are required to map all SSBs within one SSB period to corresponding ROs.

1. If the UE has determined an association period set, the UE determines that the actual association period is the minimum association period value greater than or equal to N_mapping in the determined valid association period set. For example, for an SSB period of 10 ms, the association period set determined by the UE is {1,3} SSB periods; and, if the N_mapping calculated by the UE according to the PRACH configuration information and/or the synchronization signal configuration information is equal to 3, the minimum value greater than or equal to 3 in the association period set is selected, that is, the eventually determined association period is 3 SSB periods. And, the UE performs the following operations:

(1) within the duration of the eventually determined association period, the remaining ROs except for ROs to which all SSBs within one or more SSB periods in the duration of the calculated association period can be associated completely are regarded as invalid ROs; or (2) within the duration of the eventually determined association period, the remaining ROs except for ROs to which all SSBs within one or more SSB periods can be associated completely are regarded as invalid ROs.

2. If the UE has determined a fixed association period value, the UE uses the determined fixed association period value as an actual association period, and the UE performs the following operations:

(1) within the duration of the eventually determined association period, the remaining ROs except for ROs to which all SSBs within one or more SSB periods in the duration of the calculated association period can be associated completely are regarded as invalid ROs; or (2) within the duration of the eventually determined association period, the remaining ROs except for ROs to which all SSBs within one or more SSB periods can be associated completely are regarded as invalid ROs.

Embodiment 3 (the Maximum/Minimum One of the SSB Period and the RO Period)

In this embodiment, the disclosure will be described by taking the determination of a valid association period and/or an association period set according to the maximum one of the configured PRACH configuration period and the configured SSB period as example. The configured SSB period can be configured by a base station equipment and then transmitted to the UE, and/or can be an SSB period determined by the UE autonomously (for example, a fixed SSB period assumed by the UE). For ease of description, in this embodiment, a special period configuration is expressed by a special period. For example, the special period can comprise the following situations:

1. the special period is the maximum one of the configured PRACH configuration period and the configured SSB period, that is, special period=max{SSB period, RACH period};

2. the special period is the minimum one of the configured PRACH configuration period and the configured SSB period, that is, special period=min{SSB period, RACH period}; and 3. when the PRACH configuration period is equal to the configured SSB period, the special period can be any one of the RACH period and the SSB period.

The UE receives PRACH configuration information and/or synchronization signal configuration information from the network side (e.g., from a broadcast channel, a downlink control channel or a higher-layer signaling).

The synchronization signal configuration information at least comprises SSB periods, and the number and/or position of SSBs within one SSB period. For example, N successive OFDM symbols from the $M^{th}$ OFDM symbol within one slot are regarded as one SSB. That is, the UE can determine the number (N_SSBperPeriod) of all SSBs within one SSB period and the corresponding position.

The PRACH configuration information at least comprises PRACH configuration periods or RACH periods, PRACH configuration index, PRACH frequency domain configuration (PRACH_FDM), the number (numOfSSBperRO) of SSBs associated to each PRACH occasion (RO) and more, wherein the PRACH configuration index indicates a set of configurations used for notifying a user of the number and/or position of ROs in a time domain within one PRACH configuration period, and the PRACH_FDM represents the number of and/or the position of ROs, which are in the time domain within one PRACH configuration period, in the frequency domain. That is, the UE can determine the number N_ROperRACHperoid and/or position of all ROs within one PRACH configuration period. In addition, the UE may need to obtain the number N_validROperRACHperoid and position of really valid ROs according to a certain rule. The rule can contain at least one of the following ways:

ROs in collision with a downlink part in an uplink/downlink configuration of a network configuration are regarded as invalid ROs;

ROs in collision with a part, containing SSBs, in a flexible part in the uplink/downlink configuration of the network configuration are regarded as invalid ROs; and ROs in collision with a part, before any SSB or the last SSB, in the flexible part in the uplink/downlink configuration of the network configuration are regarded as invalid ROs.

Particularly, when the UE does not find any invalid RO according to the rule, N_validROperRACHperoid=N_ROperRACHperoid.

In this case, the UE needs to determine a valid SSB-to-RO association period (also referred to as an association period hereinafter) according to a certain rule. In this embodiment, the method is to determine a valid association period and/or an association period set according to the configured special period. Specifically:

1. Corresponding association period values and/or sets are determined for different special periods according to a certain rule, expressed by a non-negative integer power of 2 as shown in the following table:

Table 5 Examples of special periods and corresponding association period values and/or sets.

TABLE 5

| Special period (ms) | Association period set (the number of special periods) |
| --- | --- |
| 5 | {1, 2, 4, 8, 16, 32} |
| 10 | {1, 2, 4, 8, 16} |
| 20 | {1, 2, 4, 8} |
| 40 | {1, 2, 4} |
| 80 | {1, 2} |
| 160 | {1} |

In addition to the direct mapping relationship table, the special periods and the corresponding association period values and/or sets can also be described by other equivalent expression methods, for example, by a formula, for example:

the association period value and/or set corresponding to each special period is expressed by:

$$\text{Association period set} = \left\{2^0, 2^1, \ldots \frac{\text{Special} - \text{period} - \text{max}}{\text{Special} - \text{period}}\right\},$$

wherein:
Special-period={5,10,20,40,80,160};
Special-period-max=max{Special-period}=160.

Particularly, in this method, it is also possible to determine corresponding association period values and/or sets for some different special periods, as shown in the following table:

Table 6 Example of special periods and corresponding association period values and/or sets.

TABLE 6

| Special period (ms) | Association period set (the number of special periods) |
|---|---|
| 5 | {1, 2, 4} |
| 10 | {1, 2, 4} |
| 20 | {1, 2, 4} |
| 40 | {1, 2, 4} |
| 80 | {1, 2} |
| 160 | {1} |

In addition to the direct mapping relationship table, the special periods and the corresponding association period values and/or sets can also be described by other equivalent expression methods, for example, by a formula, for example:

the association period value and/or set corresponding to each special period is expressed by:

$$\text{Association period set} = \left\{2^0, 2^1, \ldots \frac{\text{Special} - \text{period} - \text{max}}{\text{Special} - \text{period} - \text{Ref}}\right\},$$

wherein:
for Special-period={5,10,20,40}, Special-period-ref=40;
for Special-period={80}, Special-period-ref=80;
for Special-period={160}, Special-period-ref=160
Special-period-max=max{Special-period}=160.

2. Each special period corresponds to a fixed association period set. For example, for a special period {5,10,20,40, 80,160} ms, the corresponding association period set is {1,2,3} special periods.

In this case, the UE can determine, according to the N_validROperRACHperoid and the numOfSSBperRO, the number of SSBs that can be associated within one given RACH period, and can then infer according to the N_SSBperPeriod that N_mapping complete special periods are required to map all SSBs within one SSB period to corresponding ROs.

1. If the UE has determined an association period set, the UE determines that the actual association period is the minimum association period value greater than or equal to N_mapping in the determined valid association period set. For example, for a special period of 10 ms, the association period set determined by the UE is {1,3} special periods; and, if the N_mapping calculated by the UE according to the PRACH configuration information and/or the synchronization signal configuration information is equal to 3, the minimum value greater than or equal to 3 in the association period set is selected, that is, the eventually determined association period is 3 special periods. And, the UE performs the following operations:

(1) within the duration of the eventually determined association period, the remaining ROs except for ROs to which all SSBs within one or more SSB periods in the duration of the calculated association period can be associated completely are regarded as invalid ROs; or (2) within the duration of the eventually determined association period, the remaining ROs except for ROs to which all SSBs within one or more SSB periods can be associated completely are regarded as invalid ROs.

2. If the UE has determined a fixed association period value, the UE uses the determined fixed association period value as an actual association period, and the UE performs the following operations:

(1) within the duration of the eventually determined association period, the remaining ROs except for ROs to which all SSBs within one or more SSB periods in the duration of the calculated association period can be associated completely are regarded as invalid ROs; or (2) within the duration of the eventually determined association period, the remaining ROs except for ROs to which all SSBs within one or more SSB periods can be associated completely are regarded as invalid ROs.

Embodiment 4 (According to the Accessed Frequency Band)

In this embodiment, the disclosure will be described by taking the determination of a valid association period and/or an association period set by using either the configured PRACH configuration period or the configured SSB period is determined according to different frequency bands as an example.

Specifically: when the UE is accessed to run a system in a frequency band 1 (FR1, for example, which is a frequency band less than 6 Ghz), the UE determines a valid association period and/or an association period set by the configured SSB period; and when the UE is accessed to run a system in a frequency band 2 (FR2, for example, which is a frequency band higher than 6 Ghz), the UE determines a valid association period and/or an association period set by the configured PRACH configuration period; or when the UE is accessed to run a system in a frequency band 1 (FR1, for example, which is a frequency band less than 6 Ghz), the UE determines a valid association period and/or an association period set by the configured PRACH configuration period; and when the UE is accessed to run a system in a frequency band 2 (FR2, for example, which is a frequency band higher than 6 Ghz), the UE determines a valid association period and/or an association period set by the configured SSB period.

The specific method for determining a valid association period and/or an association period set by the configured PRACH configuration period or the configured SSB period refers to the foregoing embodiments and will not be repeated here.

Figure 5:
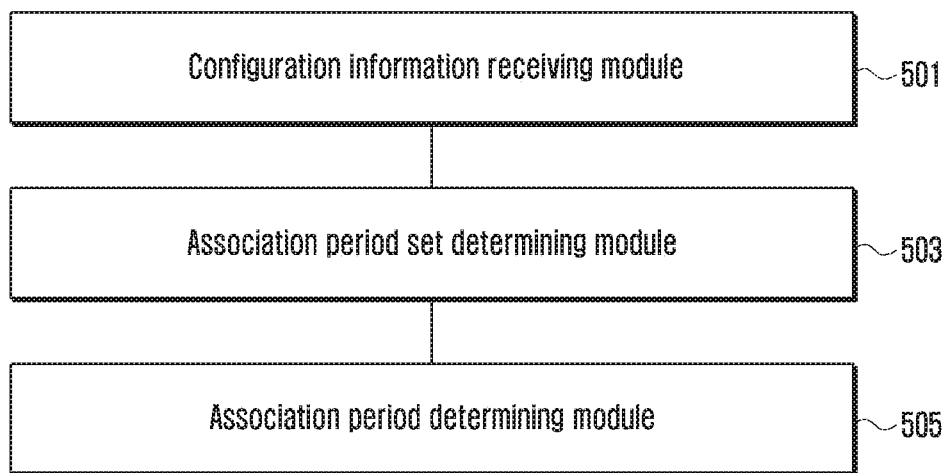
FIG. 5 is a module block diagram of a user equipment for implementing the method for determining an association period for SSBs according to an embodiment of the disclosure.

FIG. 5 is a module block diagram of a user equipment for implementing the method for determining an association period for SSBs according to an embodiment of the disclosure.

Referring to FIG. 5, the user equipment for determining an association period for SSBs in the disclosure includes a configuration information receiving module configured to receive first configuration information transmitted by a base station, an association period set determining module configured to determine a valid association period set for SSBs according to the first configuration information, and an association period determining module configured to determine an association period for SSBs from the valid association period set for SSBs.

The operating processes of the configuration information receiving module 501, the association period set determining module 503 and the association period determining module 505 correspond to the operations 101, 102 and 103 in the random access method of the disclosure, respectively, and thus, will not be repeated herein.

Figure 6:
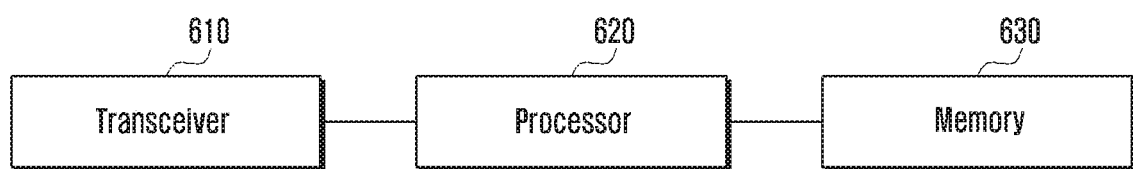
FIG. 6 is a diagram illustrating the structure of a terminal according to an embodiment of the disclosure.

FIG. 6 is a diagram illustrating the structure of a terminal according to an embodiment of the disclosure.

Referring to FIG. 6, a terminal may include a transceiver 610, a processor 620, and a memory 630. In the disclosure, the processor 620 may be defined as a circuit or application-specific integrated circuit or a controller.

The transceiver 610 may transmit/receive signals to/from another network entity. The transceiver 610 may receive, for example, downlink signal (e.g., system information) from a base station, and may transmit uplink signal (e.g., random access preamble) to a base station.

The processor 620 may control the overall operation of the terminal according to an embodiment proposed in the disclosure. For example, the processor 620 may control a signal flow between respective blocks to perform operations according to the drawings and flowcharts as described above. The processor 620 may operate in accordance with the control signal from the base station, and may control the transceiver to send/receive a message or a signal to/from the terminal and/or the base station.

The memory 630 may store at least one of information transmitted/received through the transceiver 610 and information generated through the processor 620.

Figure 7:
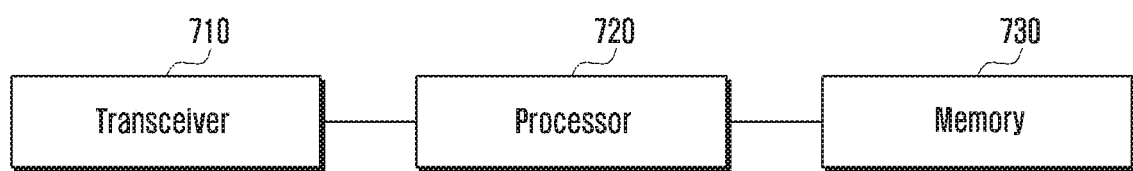
FIG. 7 is a diagram illustrating the structure of a base station according to an embodiment of the disclosure.

FIG. 7 is a diagram illustrating the structure of a base station according to an embodiment of the disclosure.

Referring to FIG. 7, a base station may include a transceiver 710, a processor 720, and a memory 730. In the disclosure, the processor 720 may be defined as a circuit or application-specific integrated circuit or a controller.

The transceiver 710 may transmit/receive signals to/from another network entity. The transceiver 710 may transmit, for example, downlink signal (e.g., system information) to a terminal, and may receive uplink signal (e.g., random access preamble) from a terminal.

The processor 720 may control the overall operation of the base station according to an embodiment proposed in the disclosure. For example, the processor 720 may control a signal flow between respective blocks to perform operations according to the drawings and flowcharts as described above. The processor 720 may operate in accordance with an uplink signal from the terminal, and may control the transceiver to send/receive a message or a signal to/from the terminal and/or the base station.

The memory 730 may store at least one of information transmitted/received through the transceiver 710 and information generated through the processor 720.

It can be known from the detailed description of the disclosure that, compared with the prior art, the disclosure has at least the following beneficial technical effects.

Firstly, by distinguishing the number of PRACH configuration periods required to map all SSBs within one SSB period to ROs and the number of actually used PRACH configuration periods, the number of the actually used PRACH configuration periods (i.e., the association period for SSBs) can be flexibly adjusted, and the efficiency of random access between a base station and a user equipment is improved.

Secondly, during the association of SSBs, invalid PRACH transmission occasions are removed, so that the collision between uplink and downlink signals is avoided, and the success rate of the random access is increased.

Thirdly, by determining a valid association period set (i.e., a set of the number of PRACH configuration periods) according to the PRACH configuration periods, SSB periods or operating frequency and then selecting an association period value for SSBs from the association period set according to a certain rule, the flexibility and expansibility of the communication system configuration are enhanced.

It should be understood by those skilled in the art that the disclosure involves devices for carrying out one or more of operations as described in the disclosure. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, compact disc-read-only memory (CD-ROM) and magneto optical disks), ROM, random access memory (RAM), erasable programmable ROM (EPROM), electrically EPROM (EEPROM), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams disclosed by the disclosure are executed by computers or other processors of programmable data processing means.

It should be understood by those skilled in the art that the operations, measures and solutions in the operations, methods and flows already discussed in the disclosure may be alternated, changed, combined or deleted. Further, other operations, measures and solutions in the operations, methods and flows already discussed in the disclosure can also be alternated, changed, rearranged, decomposed, combined or deleted. Further, the operations, measures and solutions of the prior art in the operations, methods and operations disclosed in the disclosure can also be alternated, changed, rearranged, decomposed, combined or deleted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, first information associated with a physical random access channel (PRACH) configuration period;
    receiving, from the base station, second information associated with a number of synchronization signal blocks (SSBs);
    identifying a set of association periods based on the PRACH configuration period;
    identifying, from the set of association periods, a minimum association period in which each of the SSBs is mapped at least once to random access occasions; and
    transmitting, to the base station, a random access preamble in a random access occasion within the minimum association period.

2. The method of claim 1,
    wherein the association period is an integer multiple of the PRACH configuration period.

3. The method of claim 1,
    wherein at least one association period in the set of association periods is predefined based on the PRACH configuration period.

4. The method of claim 1,
    wherein at least one random access occasion within the minimum association period which is not associated with any of the SSBs is not used for transmission of the random access preamble.

5. The method of claim 1,
    wherein third information associated with a number of random access occasions is received from the base station along with the first information,
    wherein the minimum association period is identified further based on the third information, and
    wherein the random access occasions are identified in a time domain based on the first information and are identified in a frequency domain based on the third information.

6. A method performed by a base station in a wireless communication system, the method comprising:
    transmitting, to a terminal, first information associated with a physical random access channel (PRACH) configuration period to be used to identifying a set of association periods;
    transmitting, to the terminal, second information associated with a number of synchronization signal blocks (SSBs) to be used to identify, from the set of association periods, a minimum association period in which each of the SSBs is mapped at least once to random access occasions; and
    receiving, from the terminal, a random access preamble in a random access occasion within the minimum association period.

7. The method of claim 6,
    wherein the association period is an integer multiple of the PRACH configuration period.

8. The method of claim 6,
    wherein at least one association period in the set of association periods is predefined based on the PRACH configuration period.

9. The method of claim 6,
    wherein at least one random access occasions within the minimum association period which is not associated with any of the SSBs is not used for transmission of the random access preamble.

10. The method of claim 6,
    wherein third information associated with a number of random access occasions is transmitted to the terminal along with the first information,
    wherein the minimum association period is identified further based on the third information, and
    wherein the random access occasions are identified in a time domain based on the first information and are identified in a frequency domain based on the third information.

11. A terminal in a wireless communication system, the terminal comprising:
    a transceiver to be configured to transmit and receive a signal; and
    a processor to be configured to:
        receive, from a base station, first information associated with a physical random access channel (PRACH) configuration period,
        receive, from the base station, second information associated with a number of synchronization signal blocks (SSBs),
        identify a set of association periods based on the PRACH configuration period,
        identify, from the set of association periods, a minimum association period in which each of the SSBs is mapped at least once to random access occasions, and
        transmit, to the base station, a random access preamble in a random access occasion within the minimum association period.

12. The terminal of claim 11,
    wherein the association period is an integer multiple of the PRACH configuration period.

13. The terminal of claim 11,
    wherein at least one association period in the set of association periods is predefined based on the PRACH configuration period.

14. The terminal of claim 11,
    wherein at least one random access occasion within the minimum association period which is not associated with any of the SSBs is not used for transmission of the random access preamble.

15. The terminal of claim 11,
    wherein third information associated with a number of random access occasions is received from the base station along with the first information,
    wherein the minimum association period is identified further based on the third information, and
    wherein the random access occasions are identified in a time domain based on the first information and are identified in a frequency domain based on the third information.

16. A base station in a wireless communication system, the base station comprising:
    a transceiver to be configured to transmit and receive a signal; and
    a processor to be configured to:
        transmit, to a terminal, first information associated with a physical random access channel (PRACH) configuration period to be used to identifying a set of association periods,
        transmit, to the terminal, second information associated with a number of synchronization signal blocks (SSBs) to be used to identify, from the set of association periods, a minimum association period in which each of the SSBs is mapped at least once to random access occasions, and receive, from the terminal, a random access preamble in a random access occasion within the minimum association period.

17. The base station of claim 16, wherein the association period is an integer multiple of the PRACH configuration period.

18. The base station of claim 16, wherein at least one association period in the set of association periods is predefined based on the PRACH configuration period.

19. The base station of claim 16, wherein at least one random access occasion within the minimum association period which is not associated with any of the SSBs is not used for transmission of the random access preamble.

20. The base station of claim 16, wherein third information associated with a number of random access occasions is transmitted to the terminal along with the first information,
wherein the minimum association period is identified further based on the third information, and
wherein the random access occasions are identified in a time domain based on the first information and are identified in a frequency domain based on the third information.

* * * * *